Patented Nov. 2, 1937

2,097,435

UNITED STATES PATENT OFFICE 2,097,435

THIOPHTHALIDE AND PROCESS OF MAKING THE SAME

Paul R. Austin and Paul L. Salzberg, Wilmington, Del., assignors to E. I. du Pont de Nemours & Company, Wilmington, Del., a corporation of Delaware No Drawing. Application June 19, 1935, Serial No. 27,385

15 Claims. (Cl. 260—16)

This invention relates to the subject of thiolactones and more particularly to a process of reacting lactones with sodium hydrosulfide for the preparation of sulfur bearing lactones and carboxylic acids.

The preparation of thiophthalide has previously been accomplished by the interaction of o-cyanobenzyl chloride and potassium thiocyanate (Day and Gabriel, Berichte 23, 2480 (1890)) and from phthalimidine by diazotization to produce the nitroso compound which is then treated with sodium hydrosulfide (Graebe, Annalen 247, 298 (1888)). These methods are indirect, give extremely poor yields and do not lend themselves to general application. So far as is known no ring or side chain substituted thiophthalide has been prepared, nor has a disulfide of the following formula

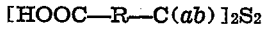

which may be obtained by the process hereinafter described, been prepared.

This invention has as an object the provision of a process which is simple, cheap and direct, for the production of thiophthalide and hitherto unprepared substituted thiophthalides. A further object is the provision of a process for the preparation of new disulfides directly from phthalide or substituted phthalides. Other objects will appear hereinafter.

These objects are accomplished by the following invention wherein a lactone of the formula

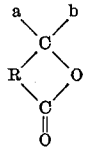

wherein R may be substituted or unsubstituted, acyclic, monocyclic, or polycyclic, aromatic, alicyclic, heterocyclic or aliphatic, $ab$ may be hydrogen atoms, alkyl or aryl groups and need not be the same, is reacted with an alkali metal hydrosulfide under essentially anhydrous conditions, the production of the thiolactone being accomplished by the production of corresponding disulfide when the reaction is carried out in the presence of air.

The reactions involved in the formation of thiophthalide are represented by the following equations:

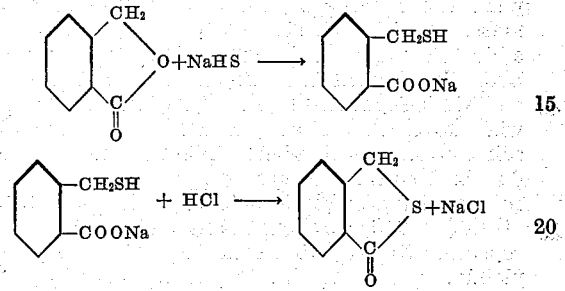

If the preceding reaction is carried out by merely fusing phthalide and sodium hydrosulfide, a high-melting sulfur-containing carboxylic acid is formed whose elementary composition corresponds to a disulfide. Presumably this product arises by oxidation of thiophthalide in alkali according to the following equations:

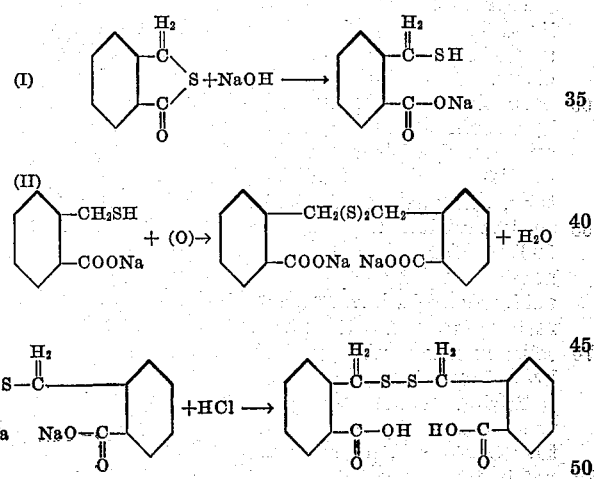

This high-melting product is hereinafter termed a disulfide.

The process of the present invention gives rise, therefore, essentially to two types of compounds. Type 1 is of the formula

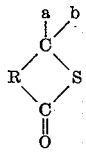

wherein R is an aromatic, aliphatic, alicyclic or heterocyclic bivalent organic radical and the two carbon atoms shown are separated by two to four carbon atoms. The substituents, a and b, may be hydrogen, alkyl or aryl groups. The second type of compound may be represented by the structure

wherein the letters have the same significance as in Type 1 and the two carbon atoms are also ortho to each other.

For the production of the disulfides mentioned above, phthalide or a substituted phthalide and powdered sodium hydrosulfide are thoroly mixed in the approximate ratio of 1 mol of phthalide to 1.5 mols of hydrosulfide and heated together without a solvent or in the presence of a substantially dry solvent. When no solvent is used, the mixture is heated slowly to approximately 180° C. when a reaction begins. It is then carefully heated at approximately 150° C. for two hours to complete the reactions. On cooling, the reaction mass, to which water is usually but not necessarily added, is mixed with excess cold concentrated hydrochloric acid and thoroly stirred. The precipitate is separated by filtration, thoroly washed with water and dissolved in sodium carbonate solution, the solution being filtered to remove undissolved sulfur and then poured into cold concentrated hydrochloric acid to reprecipitate the disulfide. This solution and precipitation may be repeated to remove excess sulfur more completely. The precipitated disulfide is crystallized, after drying, from hot absolute alcohol.

If a solvent be used with the original mixture of phthalide and sodium hydrosulfide, the mixture is heated either to the boiling point of the solvent or to approximately 150° C. Heating is continued until the major portion of the sodium hydrosulfide has reacted which usually requires about two hours.

It is to be noted that the reaction above outlined is performed under conditions in which air-oxidation of an exposed mercaptan group may occur. To inhibit the oxidizing action and to prepare the thiophthalides, phthalide and sodium hydrosulfide in the molar proportion of 1 to 1.5 are mixed with a volume of alcohol sufficient to dissolve the phthalide, placed in a reaction tube, and the solution saturated with hydrogen sulfide. The tube, after sealing, is heated at 180° C. for 2.5 hours. The contents are then added directly to cold concentrated hydrochloric acid, the solution warmed and filtered. The residue is extracted with 10% sodium carbonate solution to remove any disulfide and then crystallized from ethyl alcohol.

Having outlined above the general procedure of the invention, the following exemplifications thereof are added for purposes of illustration but not in limitation.

*Example 1.—Preparation of thiophthalide*

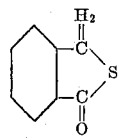

Twenty parts of phthalide, ten parts sodium hydrosulfide, and 39 parts absolute alcohol were charged into a reaction tube. Hydrogen sulfide was passed into the tube at 0° C. The tube was sealed and heated 2.5 hours at 180° C. After opening, the contents were added to 120 parts of cold concentrated hydrochloric acid, warmed on a steam bath, and then filtered. The major portion of unreacted phthalide crystallized from the filtrate. The residue, after washing thoroughly with warm water, was extracted with 10% sodium carbonate solution, then dried, and crystallized from 95% alcohol. The yield of thiophthalide obtained was 15 parts, M. P. 58° C.; pale yellow solid.

The sodium carbonate extract from the above was poured into cold, concentrated hydrochloric acid, warmed, and filtered. The residue, after washing, drying, and crystallizing from hot absolute alcohol, yielded 12.5 parts of a fluffy, white powder, M. P. 230° C. This was the disulfide. See Example 5.

*Example 2.—Preparation of 5-aminothiophthalide*

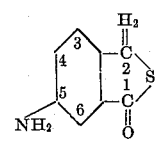

Twenty-two parts 5-aminophthalide, 15 parts sodium hydrosulfide, and 39 parts absolute alcohol were mixed and treated exactly as in Example 1. Yield of 5-aminothiophthalide obtained, 20 parts; M. P. 171° C.; color, yellow; per cent sulfur (found), 19.47; percent sulfur (calculated), 19.39.

*Example 3.—Preparation of α-(p-hydroxyphenyl) thiophthalide*

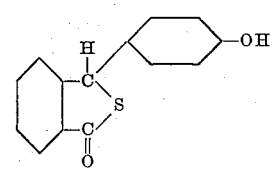

Thirty-four parts α-(p-hydroxyphenyl) phthalide, eighteen parts sodium hydrosulfide, and 39 parts absolute alcohol were treated as in Example 1. Yield of α-(p-hydroxyphenyl)-thiophthalide obtained, 12.5 parts; M. P. 134°–136° C.; per cent sulfur (found), 13.46; per cent sulfur (calculated), 13.22.

*Example 4.—Preparation of hexahydrothiophthalide*

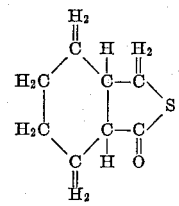

Thirty parts hexahydrophthalide, 25 parts sodium hydrosulfide, and 39 parts absolute alcohol were treated as in Example 1 except for the purification of the thio-compound which, in this case, is a liquid. This liquid was separated from the hydrochloric acid layer in a separatory funnel, diluted with ether, a small quantity of iodine added (to oxidize any unchanged mercaptan groups), and then washed repeatedly with water and sodium carbonate solution. The ether layer, after drying over calcium chloride, was distilled in vacuo and there was obtained 10 parts of hexahydrothiophthalide, B. P. 150° C. to 152° C. at 30 mm.;

$$n_D^{25}\ 1.5361$$

and 4.5 parts of 2,2 dicarbethoxybenzyl disulfide bis (from esterification of the disulfide acid in the ethanol solution), B. P. 148° C. to 155° C. at 3 mm.;

$$n_D^{25}\ 1.5430$$

*Example 5.—Preparation of o,o'-dicarboxydibenzyl disulfide*

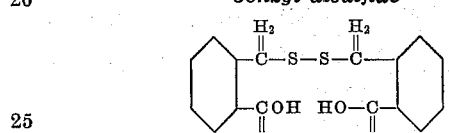

One hundred and sixty-five parts phthalide and 126 parts sodium hydrosulfide were mixed, placed in a large round bottom flask equipped with an air condenser and heated in an oil bath at 130° C. for two hours. The mixture, on cooling, was stirred with 300 parts water, poured into cold concentrated hydrochloric acid, warmed, and filtered. The filter cake was extracted with approximately 1150 parts of 15% sodium carbonate solution. This solution was filtered and again added to an excess of cold concentrated hydrochloric acid. After filtering and drying the yield was 62 parts. Crystallization from hot absolute alcohol yielded the disulfide as a white fluffy powder, M. P. 230° C.; per cent sulfur (found), 19.40; per cent sulfur (calculated), 19.16. The material insoluble in the sodium carbonate solution above was shown by melting point to be unchanged phthalide.

*Example 6.—Preparation of o,o' dicarboxydibenzyl disulfide*

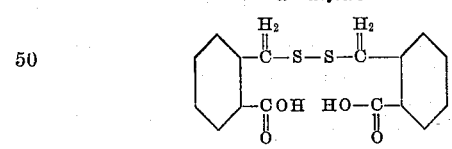

Fifty parts of sodium hydrosulfide (hydrated), 67 parts of phthalide, and 96 parts of cyclohexanol were heated on an oil bath and the temperature was raised from 100° C. to 160° C. during two and one-half hours, the water being distilled from the top of the short air-condenser with which the flask was fitted. The product was worked up as described in Example 5 and there was obtained 74 parts of the disulfide (88.6% of the theoretical amount).

*Example 7.—Preparation of 5-chlorothiophthalide*

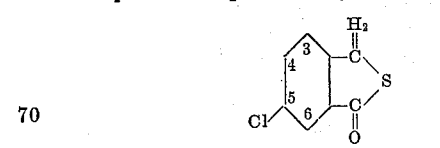

Forty parts of 5-chlorophthalide, 12 parts of sodium hydrosulfide, and 120 parts of absolute alcohol were mixed thoroly and treated exactly as described in Example 1. There was thus obtained 23 parts of 5-chlorothiophthalide which, after crystallization from alcohol, melted at 90° C., per cent sulfur (found), 17.49; per cent sulfur (calculated), 17.34.

The disulfide which was isolated in a manner analogous to that described in Example 1 was crystallized from aqueous alcohol and the yellow powder melted at 231° C.; per cent sulfur (found) 15.82; per cent sulfur (calculated), 15.88.

The nomenclature of thiophthalide derivative follows that used in Chemical Abstracts for phthalide and is as follows:

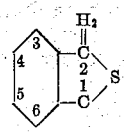

Other thiophthalides prepared by the process of Example 1 include 2-phenylthiophthalide.

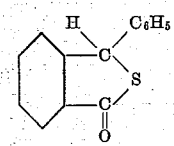

straw colored crystals melting at 105° C., and 2 (1-naphthyl) thiophthalide)

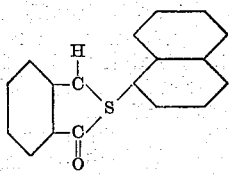

orange colored crystals melting at 135° C.

In all cases, the sodium carbonate extract from the crude thiophthalide mixture yielded, on acidification, colored products of high-melting point which were the disulfides related to the corresponding thiophthalides.

While the process has been exemplified with sodium hydrosulfide, this is not the sole reactant of its type. Alkali metal hydrosulfides in general may be employed. While the other water soluble hydrosulfides such as the alkaline earth (calcium, barium, and strontium hydrosulfides) may be employed, the alkali metal hydrosulfides and particularly sodium hydrosulfide are preferred. The reaction is carried out under substantially anhydrous conditions, i. e., in the substantial absence of water as such. Hydrated sodium hydrosulfide may be used as disclosed in Example 6, the water of hydration being driven off at the temperature of the reaction.

The process is generally applicable to the reaction of a hydrosulfide as discussed above with a compound of the formula:

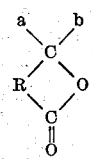

in which R may be aromatic, alicyclic, aliphatic or heterocyclic, R may be substituted or unsubstituted, may be monocyclic, acyclic or polycyclic, and in which the two carbon atoms shown are separated by two to four carbon atoms, inclusive. The small letters *a* and *b* may be hydrogen atoms, alkyl or aryl groups, and need not necessarily be the same group and may be substituted.

The process may therefore be applied generally to gamma, delta, and epsilon lactones, i. e., lactones wherein the carboxyl carbon and the carbinol carbon are separated by two to four carbon atoms, such as naphthalide, α-campholide, 4-hydroxy-1,2,3,4-tetrahydronaphthoic acid lactone, 2,2-diphenylphthalide, γ-phenylbutyrolactone, 2-ethylphthalide, valerolactone, diphenide, as well as the phthalide, hexahydrophthalide, aminophthalide, phenylphthalide, and naphthylphthalide disclosed above. The preferred embodiment of the invention is that wherein the process is applied to a gamma lactone and preferably to a gamma lactone of a cyclic hydroxy carboxylic acid preferably an aromatic hydroxy carboxylic acid such as an o-hydroxymethylbenzoic acid, i. e., a phthalide.

When the reaction is carried out under conditions such that oxygen or air is substantially excluded, a thiolactone, e. g., thiophthalide type of compound, is the major product. In the presence of air, a disulfide is the major product. It has been found that the use of hydrogen sulfide and of inert gases other than hydrogen sulfide, such as nitrogen or methane aids in the reduction of the formation of the disulfide. The reaction may also be performed in vacuo. It is preferred to use hydrogen sulfide as the inert gas, since it reacts with any sodium hydroxide or sodium sulfide which may be present in the reaction to produce more sodium hydrosulfide. The disulfides are usually prepared by heating phthalide with sodium hydrosulfide and contemporaneous or subsequent oxidation in substantially a one-step process. However, the disulfide may be prepared from thiophthalides by oxidation of the alkali metal salts.

While the compounds obtained by the oxidation of thiophthalides have been referred to above as disulfides, it is to be understood that any product prepared by the method illustrated in Examples 5 and 6 is to be considered as being within the scope of this invention whether or not a true disulfide linkage is present.

Solvents other than ethyl alcohol may be used. In general, any non-aqueous inert organic solvent may be employed such as benzene, cyclohexane, cyclohexanol, butyl alcohol, decalin, anisoe, phenetole, tetralin, dioxan, ethoxyethanol, toluol, xylol, etc. The temperature may be as low as 100° C. or as high as 250° C. and the time of heating may vary from as little as fifteen minutes to several hours, but the reaction is rapid and is usually not unduly prolonged. A temperature range of 130°–200° C. and a time of heating of two to four hours produces optimum results for the production of either thiophthalides or disulfides. It is not an essential condition that the reaction be conducted in a closed system or under pressure for the production of thiophthalides. Such conditions simply facilitate the exclusion of air and permit a wider choice of solvents. The ratios of phthalide and sodium hydrosulfide may vary from equal molar proportions to a large excess of sodium hydrosulfide.

The present invention produces thiophthalide directly from phthalide in good yield. It produces disulfides likewise directly from phthalide in high yield, is generally applicable to the production of substituted thiophthalides and disulfides and utilizes materials which are readily available and cheap.

The thiophthalides and the corresponding disulfides, many of which are new compositions of matter, are useful as insecticides, acid inhibitors, lubricant assistants and flotation agents.

The above description and examples are intended to be illustrative only. Any modification of or variation therefrom which corresponds to the spirit of the invention is intended to be included within the scope of the claims.

We claim:

1. Process which comprises reacting phthalide with sodium hydrosulfide in the presence of hydrogen sulfide and an inert solvent under substantially anhydrous conditions at a temperature between 100° C. and 250° C.

2. Process which comprises reacting a phthalide with sodium hydrosulfide in the presence of hydrogen sulfide and an inert solvent under substantially anhydrous conditions at a temperature between 100° C. and 250° C.

3. Process which comprises reacting sodium hydrosulfide in the presence of hydrogen sulfide and an inert solvent under substantially anhydrous conditions between 100° C. and 250° C. with a gamma lactone.

4. Process which comprises reacting sodium hydrosulfide under essentially anhydrous conditions at a temperature between 100° C. and 250° C. with a gamma to epsilon lactone.

5. Process which comprises reacting an alkali metal hydrosulfide under essentially anhydrous conditions at a temperature between 100° C. and 250° C. with a gamma to epsilon lactone.

6. Process which comprises reacting a water soluble hydrosulfide under essentially anhydrous conditions at a temperature between 100° C. and 250° C. with a gamma to epsilon lactone.

7. Process which comprises reacting at a temperature between 100° C. and 250° C. phthalide in the presence of oxygen under substantially anhydrous conditions with sodium hydrosulfide.

8. Process which comprises reacting at a temperature between 100° C. and 250° C. a phthalide in the presence of oxygen under substantially anhydrous conditions with sodium hydrosulfide.

9. Process which comprises reacting at a temperature between 100° C. and 250° C. phthalide in the absence of oxygen under substantially anhydrous conditions with sodium hydrosulfide.

10. Process which comprises reacting at a temperature between 100° C. and 250° C. a phthalide in the absence of oxygen under substantially anhydrous conditions with sodium hydrosulfide.

11. Process which comprises reacting at a temperature between 100° C. and 250° C. a phthalide under substantially anhydrous conditions with an alkali metal hydrosulfide.

12. A thiophthalide wherein at least one hydrogen atom is replaced by an aromatic substituent.

13. A thiophthalide wherein at least one of the hydrogen atoms on the 2 carbon atom is replaced by an aromatic substituent.

14. A thiophthalide derivative as defined in claim 13 wherein the substituent is a radical identical with that to which it is joined.

15. A bis (o-carboxybenzyl) disulfide.

PAUL R. AUSTIN.
PAUL L. SALZBERG.

CERTIFICATE OF CORRECTION.

Patent No. 2,097,435.                                November 2, 1937.

PAUL R. AUSTIN, ET AL.

It is hereby certified that error appears in the printed specification of the above numbered patent requiring correction as follows: Page 4, first column, line 48, for "anisoe" read anisole; and that the said Letters Patent should be read with this correction therein that the same may conform to the record of the case in the Patent Office.

Signed and sealed this 25th day of January, A. D. 1938.

(Seal)

Henry Van Arsdale,
Acting Commissioner of Patents.